US011048254B2

(12) United States Patent
Li et al.

(10) Patent No.: US 11,048,254 B2
(45) Date of Patent: Jun. 29, 2021

(54) GENERATING SIMPLIFIED OBJECT MODELS TO REDUCE COMPUTATIONAL RESOURCE REQUIREMENTS FOR AUTONOMOUS VEHICLES

(71) Applicant: Waymo LLC, Mountain View, CA (US)

(72) Inventors: Dong Li, Los Gatos, CA (US); Fang Da, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 128 days.

(21) Appl. No.: 16/380,398

(22) Filed: Apr. 10, 2019

(65) Prior Publication Data
US 2020/0326703 A1 Oct. 15, 2020

(51) Int. Cl.
*G05D 1/00* (2006.01)
*G05D 1/02* (2020.01)

(52) U.S. Cl.
CPC ......... *G05D 1/0088* (2013.01); *G05D 1/0231* (2013.01); *G05D 2201/0213* (2013.01)

(58) Field of Classification Search
None
See application file for complete search history.

(56) References Cited

U.S. PATENT DOCUMENTS

| 8,989,944 | B1  | 3/2015  | Agarwal et al. |
| 9,120,484 | B1* | 9/2015  | Ferguson .................. G06T 7/20 |
| 9,904,867 | B2  | 2/2018  | Fathi et al. |
| 10,152,771 | B1 | 12/2018 | Li et al. |
| 10,163,213 | B2 | 12/2018 | Boyle et al. |
| 2016/0018524 | A1 | 1/2016 | Zeng |
| 2017/0043769 | A1 | 2/2017 | Madas et al. |
| 2017/0158175 | A1 | 6/2017 | Fairfield |
| 2018/0136332 | A1 | 5/2018 | Barfield et al. |
| 2018/0144500 | A1 | 5/2018 | Lam et al. |
| 2018/0158235 | A1* | 6/2018 | Wu .......................... G06T 19/20 |

FOREIGN PATENT DOCUMENTS

WO 2015176933 A1 11/2015

OTHER PUBLICATIONS

International Search Report and Written Opinion for Application No. PCT/US2020/027441 dated Jul. 20, 2020.
Zoltan Rozsa and Tamas Sziranyi, Obstacle Prediction for Automated Guided Vehicles Based on Point Clouds Measured by a Tilted LIDAR Sensor, pp. 1-13, 2018.

* cited by examiner

*Primary Examiner* — Kelly D Williams
(74) *Attorney, Agent, or Firm* — Botos Churchill IP Law

(57) ABSTRACT

Aspects of the disclosure relate to controlling a vehicle using a simplified model of an object. In one example, sensor data including a plurality of data points corresponding to surfaces of the object in the vehicle's environment may be received from one or more sensors of the vehicle. A first model may be determined using a subset of the plurality of data points. A set of secondary data points may be identified from the plurality of data points using a point on the vehicle. The set of secondary data points may be filtered from the subset of the plurality data points to determine a second model, wherein the second model is a simplified version of the first model. The vehicle may be controlled in an autonomous driving mode based on the second model.

20 Claims, 9 Drawing Sheets

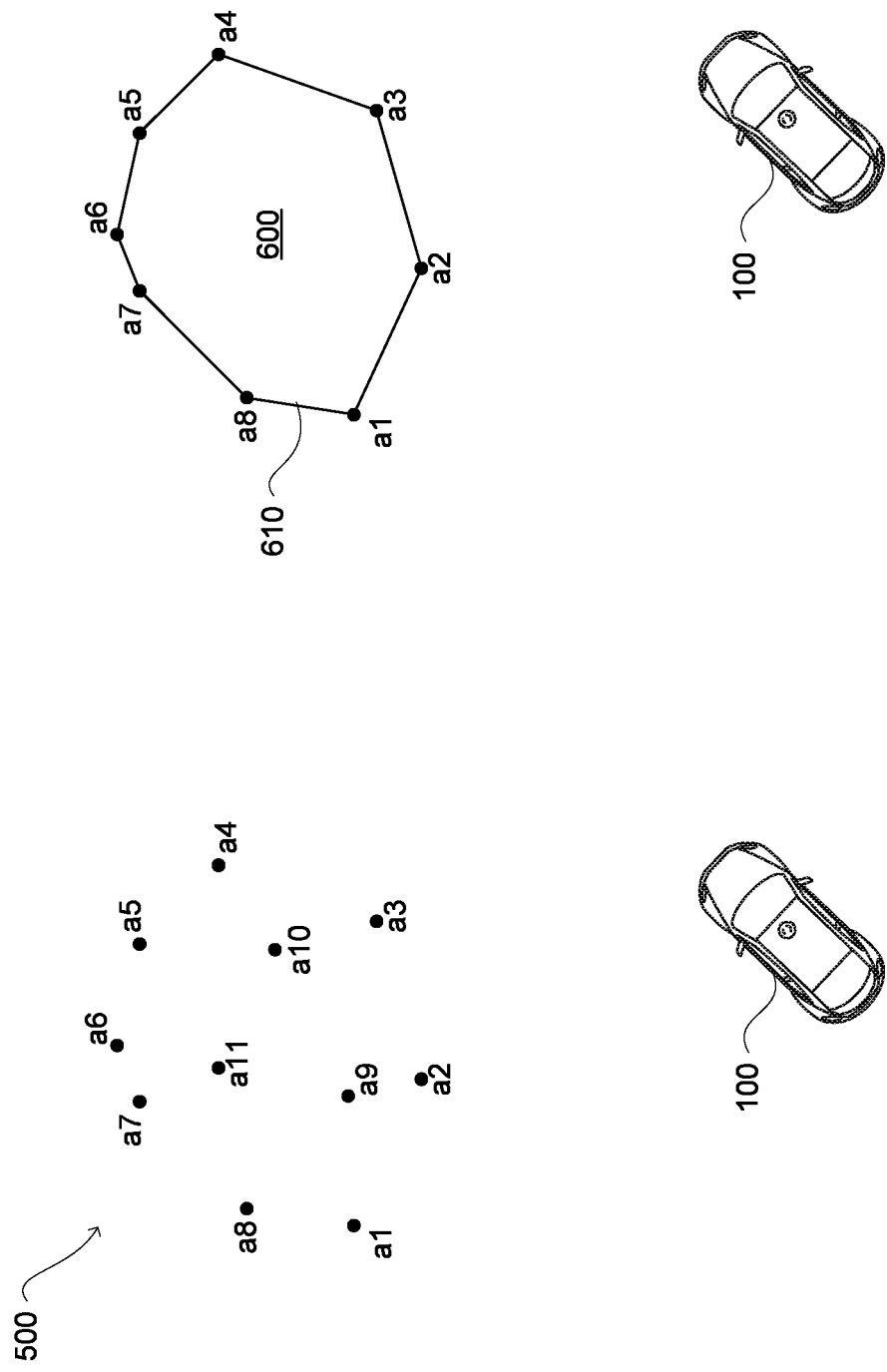

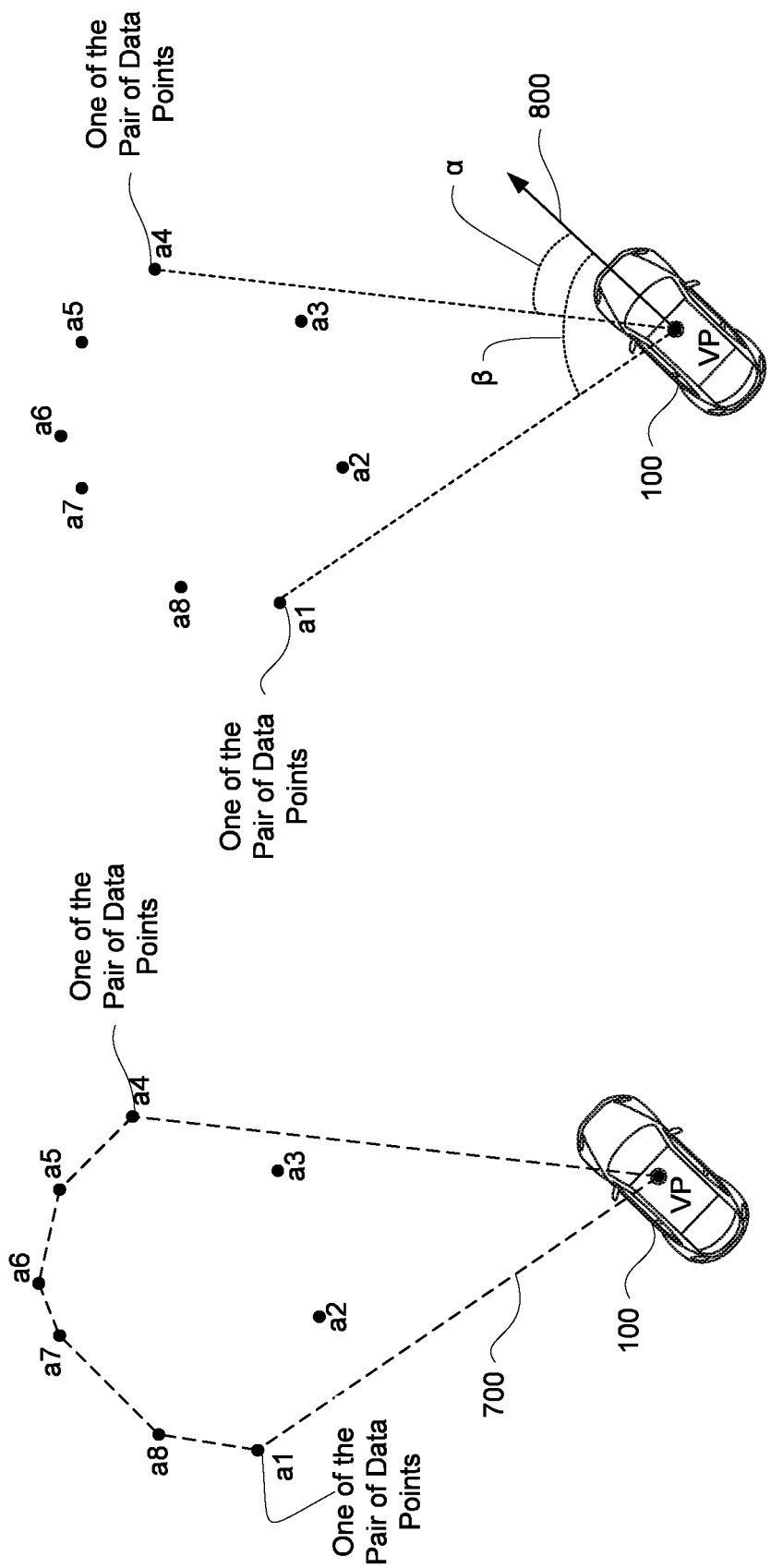

GENERATING SIMPLIFIED OBJECT MODELS TO REDUCE COMPUTATIONAL RESOURCE REQUIREMENTS FOR AUTONOMOUS VEHICLES

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc. These images and sensor data allow the vehicle to safely maneuver itself around various objects.

BRIEF SUMMARY

One aspect of the disclosure provides a method of controlling a vehicle using a simplified model of an object. The method includes receiving, by one or more computing devices from one or more sensors of the vehicle, sensor data including a plurality of data points corresponding to surfaces of the object in the vehicle's environment; determining, by the one or more computing devices, a first model representative of the object using a subset of the plurality of data points; identifying, by the one or more computing devices, a set of secondary data points from the plurality of data points using a point on the vehicle; filtering, by the one or more computing devices, the set of secondary data points from the subset of the plurality data points to determine a second model representative of the object, wherein the second model is a simplified version of the first model; and controlling, by the one or more computing devices, the vehicle in an autonomous driving mode based on the second model.

In one example, the plurality of data points received from a LIDAR sensor of the vehicle, and the point on the vehicle is a point on the LIDAR sensor. In another example, determining the first model includes determining a convex hull of the plurality of data points defined by the subset of data points. In this example, identifying the set of secondary data points includes identifying data points of the convex hull corresponding to a side of the convex hull that are oriented away from the vehicle relative to other data points of the convex hull. Alternatively, identifying the set of secondary data points includes determining a modified convex hull based on the subset of data points and the point on the vehicle. In this example, identifying the set of secondary data points further includes identifying a pair of data points from the modified convex hull using the point on the vehicle. In addition, the pair of data points correspond to two data points in the modified convex hull on either side of the point on the vehicle or the pair of data points correspond to two data points in the modified convex hull that are closest to the point on the vehicle. As another alternative, identifying the set of secondary data points includes identifying data points of the modified convex hull or the first model that are located farther from the point on the vehicle than either of the pair of data points. In another example, the set of secondary data points includes identifying a pair of data points from the subset of data points using a reference vector originating at the point on the vehicle. In this example, the reference vector extends in a direction of one of a heading of the vehicle or an orientation of the vehicle. Alternatively, the reference vector extends in a direction of a direction of traffic of a lane in which the vehicle is traveling. As another alternative, a first of the pair of data points is identified as a data point of the subset of data points that is positioned at a smallest angle relative to the reference angle of the vehicle, and a second of the pair of data points is identified as a data point of the subset of data points that is positioned at a greatest angle relative to the reference angle of the vehicle. In this example, identifying the set of secondary data points further includes determining a space defined by the first of the pair of data points, a second of the pair of data points, and the point on the vehicle. In addition, identifying the set of secondary data points includes identifying ones of the subset of data points that are outside of the space. In another example, the first model is determined by ignoring a height dimension of the plurality of data points. In another example, the first model is determined by projecting the plurality of data points onto a two-dimensional plane. In another example, each of the first model and the second model are two-dimensional representations of the object. In another example, the point on the vehicle is a two-dimensional point. In another example, controlling the vehicle based on the second model includes passing data of the second model to one or more systems of the vehicle in order to make driving decisions for the vehicle using the second model.

BRIEF DESCRIPTION OF THE DRAWINGS

FIG. 5 is an example representation of a vehicle and a point cloud in accordance with aspect of the disclosure.

FIG. 6 is an example representation of a vehicle and a first model in accordance with aspect of the disclosure.

FIG. 7 is an example representation of a vehicle, data points, and a modified contour hull in accordance with aspect of the disclosure.

FIG. 8 is an example representation of a vehicle, data points, angles, and a reference vector modified contour hull in accordance with aspect of the disclosure.

DETAILED DESCRIPTION

Overview

Figure 1:
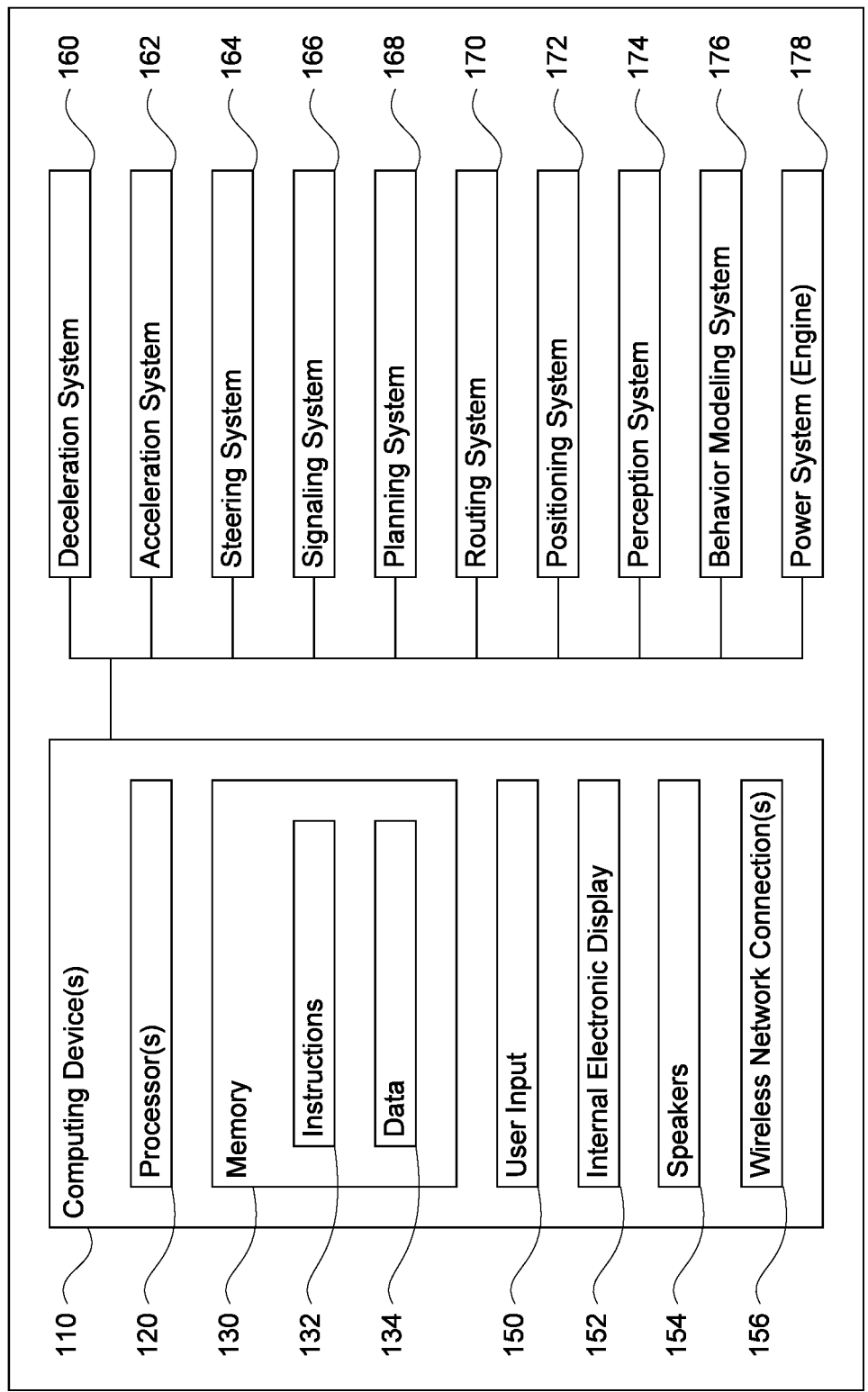
FIG. 1 is a functional diagram of an example vehicle in accordance with an exemplary embodiment.

The technology relates to controlling an autonomous vehicle by generating contour models of objects in the autonomous vehicle's environment. For example, a computing device of an autonomous vehicle may generate a model that represents a contour of an object detected in the vehicle's environment using data corresponding to surfaces of the object. The vehicle's computing devices may use this model to perform various computations, such as behavior predictions and trajectory planning. However, in many instances, the contours of the detected object may be very complex, for instance being defined by a polygon including large numbers of vertices. As such, computations using the model may result in the expenditure of more computing resources and time than necessary. Because of the finite nature of the computing resources on these vehicles and the need to use these computations to make real time driving decisions, the use of such resources can quickly become a problem. In order to address these issues, the vehicle's computing devices may be configured to reduce the complexity of the models in order to accelerate computations performed by various systems of the vehicle using those models.

The vehicle's computing devices may receive, from one or more sensors of the vehicle, sensor data including a plurality of data points corresponding to the surfaces of an object detected in the vehicle's environment. The vehicle's computing devices may determine a simplified model of the object based on a subset of the plurality of data points. A first model may be generated by analyzing the data points of a point cloud corresponding to an object in three dimensions. These 3D data points may be projected onto a 2D surface or plane, or alternatively, the height dimension (Z) may simply be ignored, deleted, etc. A first model may then be generated by identifying a convex set or a convex hull from the 2D data points.

The vehicle's computing devices may then generate a second model by filtering or otherwise ignoring data points of the first model that are unnecessary to controlling the vehicle (hereafter, "secondary points"). For instance, the secondary points may correspond to a side of the first model that is generally oriented away from the vehicle.

In order to identify the secondary points, a point on the vehicle may be identified. The computing devices of the vehicle may then use the point on the vehicle to determine a modified convex hull. The modified convex hull may be determined using the set of data points including data points of the first model with the point on the vehicle. The vehicle's computing devices may also identify a pair of points of the modified convex hull using the point on the vehicle. Alternatively, the pair of points may be identified based on a reference vector of the vehicle. For instance, the reference vector may be a vector that originates from the point on the vehicle and extends in a direction of a heading or orientation of the vehicle or a lane in which the vehicle is traveling.

A set of one or more secondary points may then be identified. For instance, the secondary points may be those of the first model or the modified convex hull that are located farther from the point on the vehicle than the pair of points. The vehicle's computing devices may identify a first point of the pair of data points from the data points of the first model that is positioned at a smallest angle relative to the reference angle of the vehicle. The computing devices may also identify a second point of the pair of data points from the data points of the first model that is positioned at a greatest angle relative to the reference vector. The vehicle's computing devices may then determine a space enclosed by a point on the vehicle, the first point, and the second point. Points of the first model that are outside of the space may be identified as secondary points.

The computing devices may then determine a second model by filtering or otherwise removing the secondary points from the first model. The second model may be a significant reduction in the complexity of a model of an object corresponding to a polyhedron as well as the first model. As such, where computation time and complexity are controlled by the number of points in a model representing an object, reducing the number of points in a model representing an object may increase the speed and efficiency of the computations necessary for controlling the vehicle safely. The vehicle's computing devices may the control the vehicle based on the second model.

The features described herein may provide for the generation of simplified models which represent objects that are both informative and efficient for computation purposes without sacrificing safety. By reducing complexities of the models of objects, computations using those models may be simplified, which may reduce the computational resources required and shorten the amount of time needed for the computations. This, in turn, may improve the response time and safety of the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130. Each of these systems may include various hardware such as computing devices including processors and memory similar to processors 120 and memory 130 as well as software, in order to enable these systems to perform various tasks. Again, although these systems are shown as external to computing devices 110, in actuality, all or some of these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 168 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
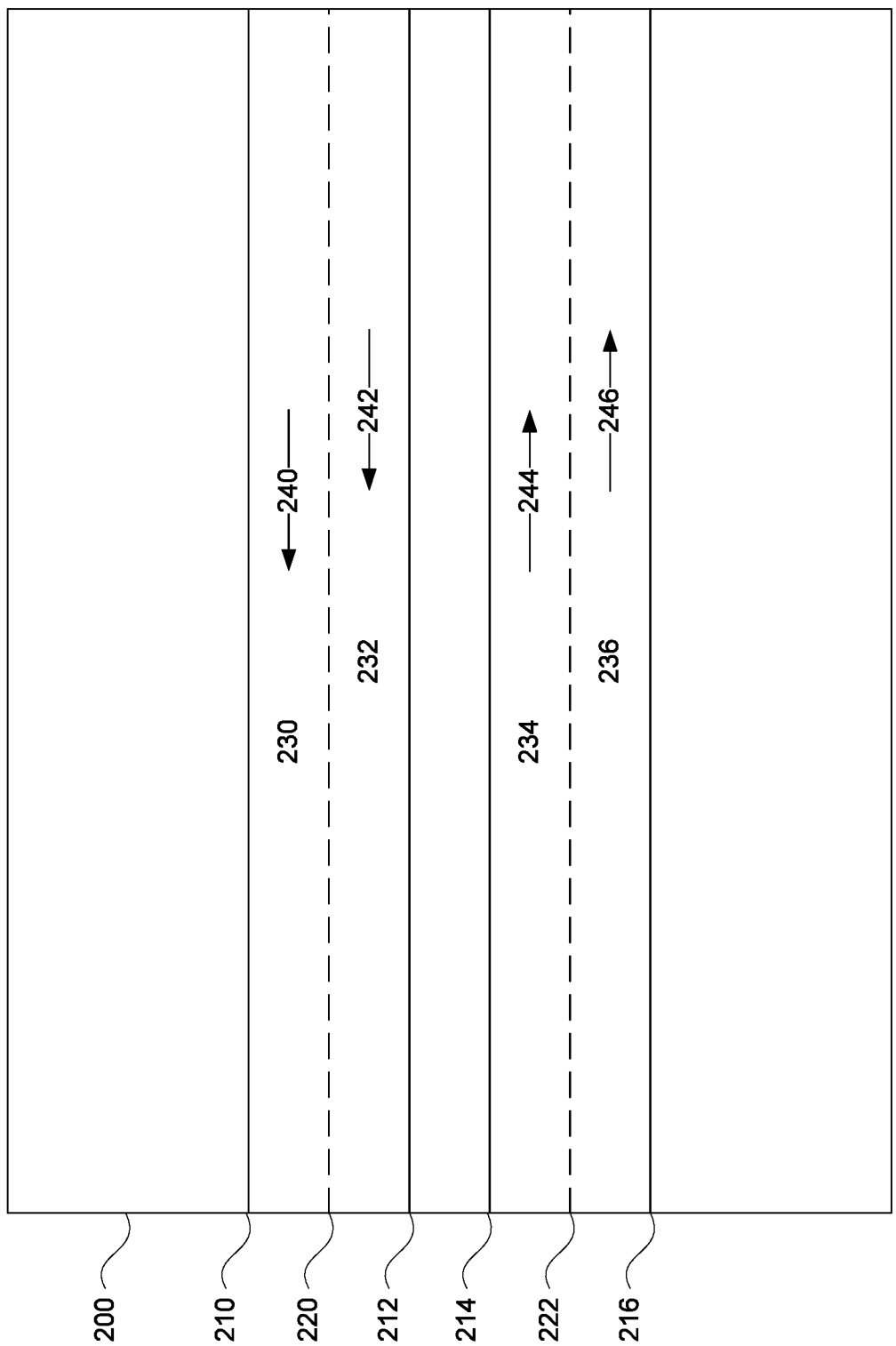
FIG. 2 is an example of map information in accordance with aspects of the disclosure.

FIG. 2 is an example of map information 200 for a section of roadway. In this example, the map information 200 includes information identifying the shape, location, and other characteristics of lane lines represented by solid lines 210, 212, 214, 216 and dashed-lines 220, 222 which may designate roads or otherwise drivable areas including lanes 230, 232, 234, 236. In addition, the map information may also include information identifying the direction of travel or traffic flow for each lane represented by arrows 240, 242, 244, 246. Although only a few features are shown and identified, the map information 200 may be highly-detailed and include various additional features, including for instance the locations and boundaries of blockages as discussed further below.

Although the map information is depicted herein as an image-based map, the map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
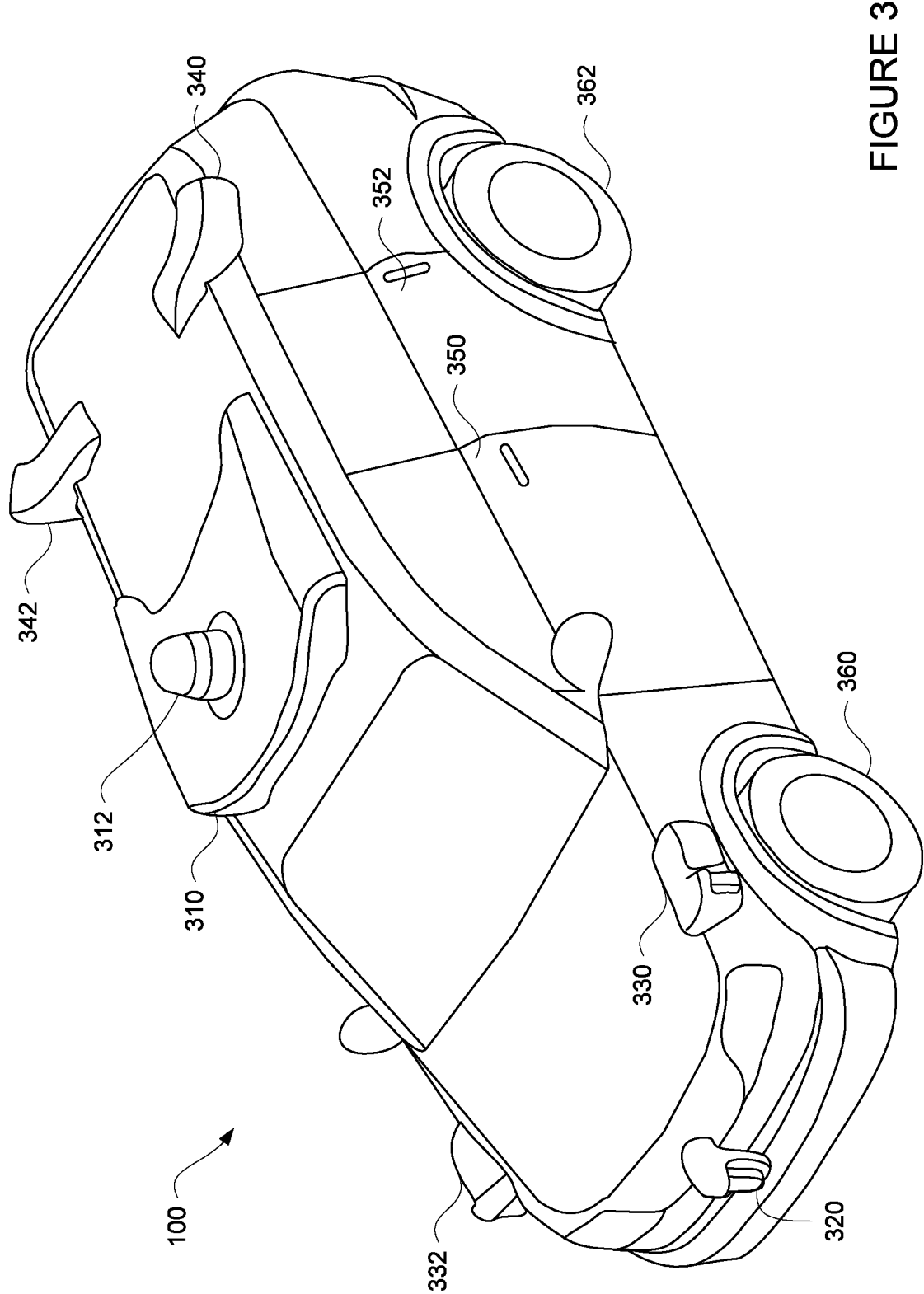
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing devices 110 and/or other computing devices of the various systems of the vehicle 100. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various models based on object type to output a predicted future behavior for a detected object. In other instances, the characteristics may be put into one or more detection system software modules of the behavior modeling system 176, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle.

Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

References to the vehicle's computing devices may include computing devices 110 or the other computing devices of the various systems of the vehicle, for instance, the perception system 174 or some other dedicated computing devices configured similarly to computing devices 110 (i.e. having processors 120 and memory 130). The vehicle's computing devices may receive, from one or more sensors of the vehicle, sensor data including a plurality of points corresponding to the surfaces of an object detected in the vehicle's environment. For instance, one or more LIDAR sensors of the vehicle, such as a LIDAR sensor of dome housing 312, may send out a laser light pulse and receive reflections of that pulse back at an optical sensor of the LIDAR sensor. These reflections may be translated into data points identifying the location and intensity of surfaces of an object. The LIDAR sensor may further process the data points in order to group data points corresponding to the same object together. The result of this processing may be a model including a contour of an object (or multiple objects that are so close together as to be indistinguishable as separate objects by the LIDAR sensor) and a "point cloud" or the group of data points identified as belonging to the object. The model may be a polyhedron or a 3D polygon and the contour may be drawn for example, by connecting data points of the point cloud such that the polyhedron has the largest possible volume. Alternatively, the model may be a rectangular cuboid drawn with the smallest volume possible to include all of the data points of the point cloud.

In order to collect more information about the vehicle's environment, in some instances the one or more LIDAR sensors may be positioned as high as possible on a vehicle, for instance, on a roof panel of the vehicle as with the LIDAR sensor of dome housing 312. As a result, the one or more LIDAR sensors may collect data points corresponding to surfaces of the object that are generally oriented away from or vehicle 100. As a result, the polyhedron may be a highly complex structure with a large number of vertices.

Figure 4:
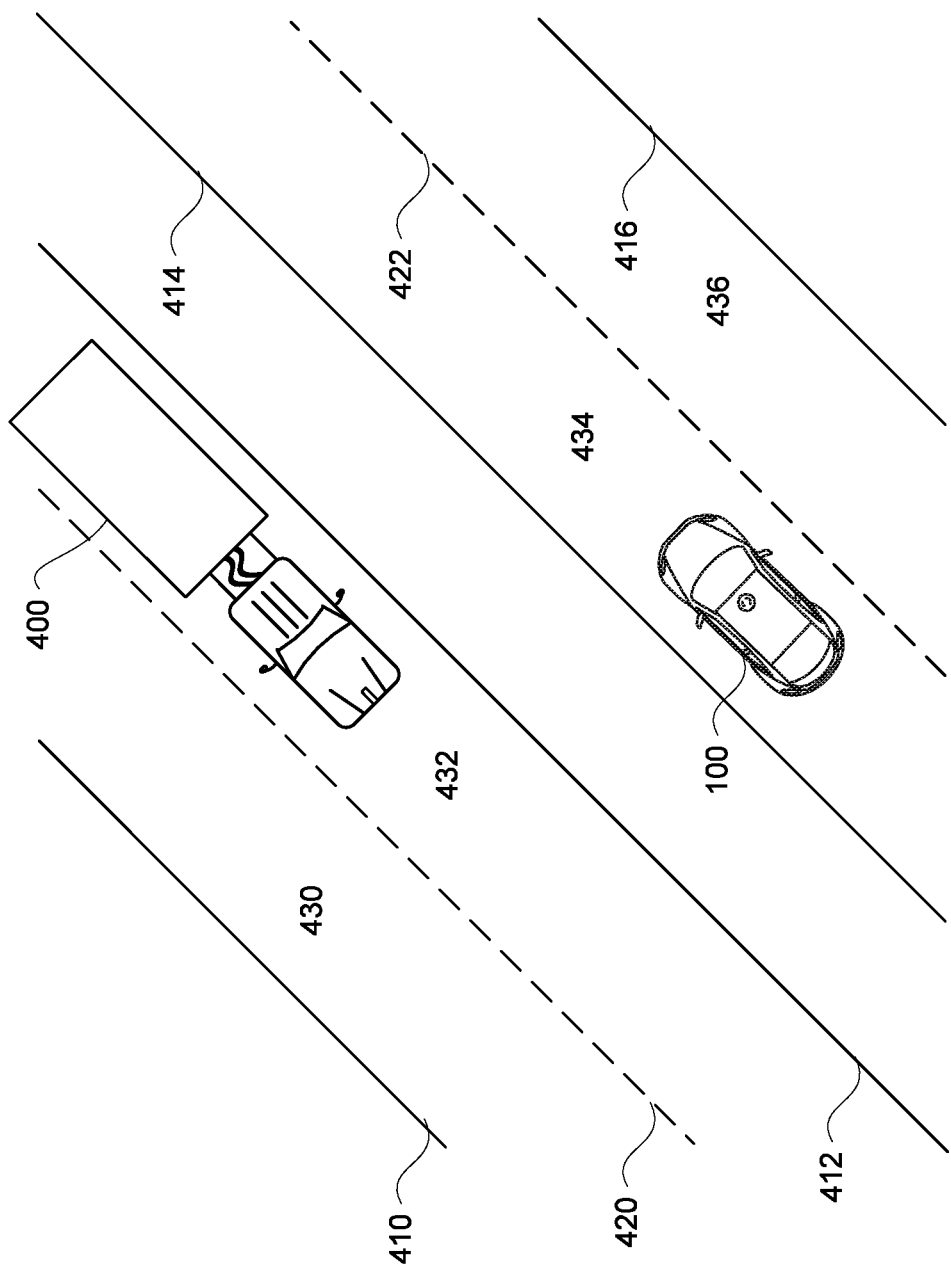
FIG. 4 is an example view of a vehicle and a section of roadway in accordance with aspect of the disclosure.

FIG. 4 provides an example of vehicle 100 driving in a section of roadway which may correspond to the map information 200. For instance, the shape, location and other characteristics of solid lane lines 410, 412, 414, 416, dashed lane lines 420, 422, and lanes 430, 432, 434, 436 correspond to the shape, location and other characteristics of solid lines 210, 212, 214, 216, dashed-lines 220, 222, and lanes 230, 232, 234, 236, respectively. In this example, a second vehicle, object 400, is driving in lane 432 which is adjacent to lane 434 in which vehicle 100 is driving.

FIG. 5 is an example of a point cloud 500 generated by a LIDAR sensor of vehicle 100, such as the LIDAR sensor of dome housing 312, from the surfaces of object 400. As shown, the point cloud 500 includes a plurality of data points labeled a1-a11. The distances and configuration of the plurality of data points a1-a11 are exaggerated for ease of understanding. In this example, points a5-a8 may be generated by detecting the geographic position of points corresponding with the top edge of the far side of the truck. Although FIG. 5 depicts a top-down view of the data points of the point cloud 500 such that these data points appear to be only two dimensional, some of the data points a1-a11 may be in different planes and thus may actually exist in three dimensions.

The vehicle's computing devices may determine a simplified model of the object based on a subset of the plurality of the detected points. A first model may be generated by analyzing the 3D data points of the point cloud 500 in two dimensions (2D). For instance, the 3D data points may be projected onto a 2D surface or plane, or alternatively, the height dimension (Z) may simply be ignored, deleted, etc. The model may then be generated by identifying a convex set of the 2D data points. For purposes of controlling a vehicle that is more or less confined to movements on a 2D plane such as roads, it may be sufficient to use a 2D contour model of the detected object so long as the data is flagged or otherwise identified as corresponding to an object that the vehicle is not able to drive over or through. In addition, since 3D computations are more complex and time consuming, determining 2D contour models may increase the efficiency of the computations used to control the vehicle. In this regard, the 2D contour model may be a contour model representing the detected object when viewed from a point above the detected object.

FIG. 6 depicts a first model 600 determined by computing a convex hull from the 2D data of the plurality of data points a1-a11 in the point cloud 500. The first model 600 include data points of the point cloud 500 that define a convex hull 610 (data points a1-a8), but excludes the points within the convex hull (data points a9-11). In this regard, the points a1-a8 correspond to the vertices of a 2D polygon of the first model 600.

The vehicle's computing devices may then generate a second model by filtering or otherwise ignoring data points of the first model that are unnecessary to controlling the vehicle (hereafter, "secondary points"). For instance, the secondary points may correspond with a side of the first model that is generally oriented away from the vehicle. By way of example, the object 400 is in a lane next to the vehicle, the vehicle's computing devices may safely control the vehicle 100 based on the position of the data points corresponding to surfaces of the object that are generally oriented towards the vehicle. More specifically, the vehicle's computing devices may control the vehicle to maintain a safe distance from a surface of the truck closest to the vehicle. As such, the contour of the far side of the object may not always be necessary, and therefore can be excluded from the model in some instances.

In order to identify the secondary points, a point on the vehicle may be identified. For example, turning to FIG. 7, the point VP may represent a point on the vehicle. In this example, the point VP actually corresponds to the location of the LIDAR sensor that generated the data points of the point cloud 500, though other points could also be used. Again, although the point VP is depicted as being on top of the vehicle 100, the point VP need only actually include two dimensions, and thus, the height dimension (Z) of the point on the vehicle may be filtered or otherwise ignored.

The point on the vehicle may then be used to identify a pair of data points from the first model or the convex hull. As one example, the computing devices of the vehicle 100 may then use the 2D data of the point on the vehicle to determine a modified convex hull. The modified convex hull may be determined using the set of data points including data points of the first model with the point on the vehicle. For instance, as shown in FIG. 7, a modified convex hull 700 includes the point VP as well as data points a1 and a4-a8.

The vehicle's computing devices may then identify a pair of data points from the first model or the modified convex hull using the point on the vehicle. For instance, the data points on either side of the point on the vehicle in the modified convex hull may be identified as the pair of data points or put differently, the two data points closest to the point on the vehicle in the modified convex hull may be identified. Returning to FIG. 7, data points a1 and a4 of the modified convex hull 700 are closest to the point VP.

Alternatively, the secondary points may be identified based on a reference vector. For instance, the reference vector may be a vector that originates from the point on the vehicle and in a direction of a heading (the direction in which the vehicle is driving) or orientation (the direction in which a front end of the vehicle is oriented) of the vehicle 100 or the direction of traffic of a lane in which the vehicle is traveling. For example, as shown in FIG. 8, a reference vector 800 corresponding to the heading of the vehicle 100, the orientation of the vehicle 100, and or the direction of traffic of lane 434 (i.e. the direction represented by arrow 244 of FIG. 2).

The vehicle's computing devices may identify one of the pair of data points from the data points of the first model or modified convex hull that is positioned at a smallest angle relative to the reference angle of the vehicle. The computing devices may also identify another one of the pair of data points from the data points of the first model or modified convex hull that is positioned at a greatest angle relative to the reference vector. For example, data point a4 may be identified as one of the pair of data points because data point a4 the smallest relative angle, here angle α, between the point VP and the reference vector. Data point a1 may be identified as another of the pair of data points because data point a1 has the greatest relative angle, here angle β, between the point VP and the reference vector.

Figures 9, 10:
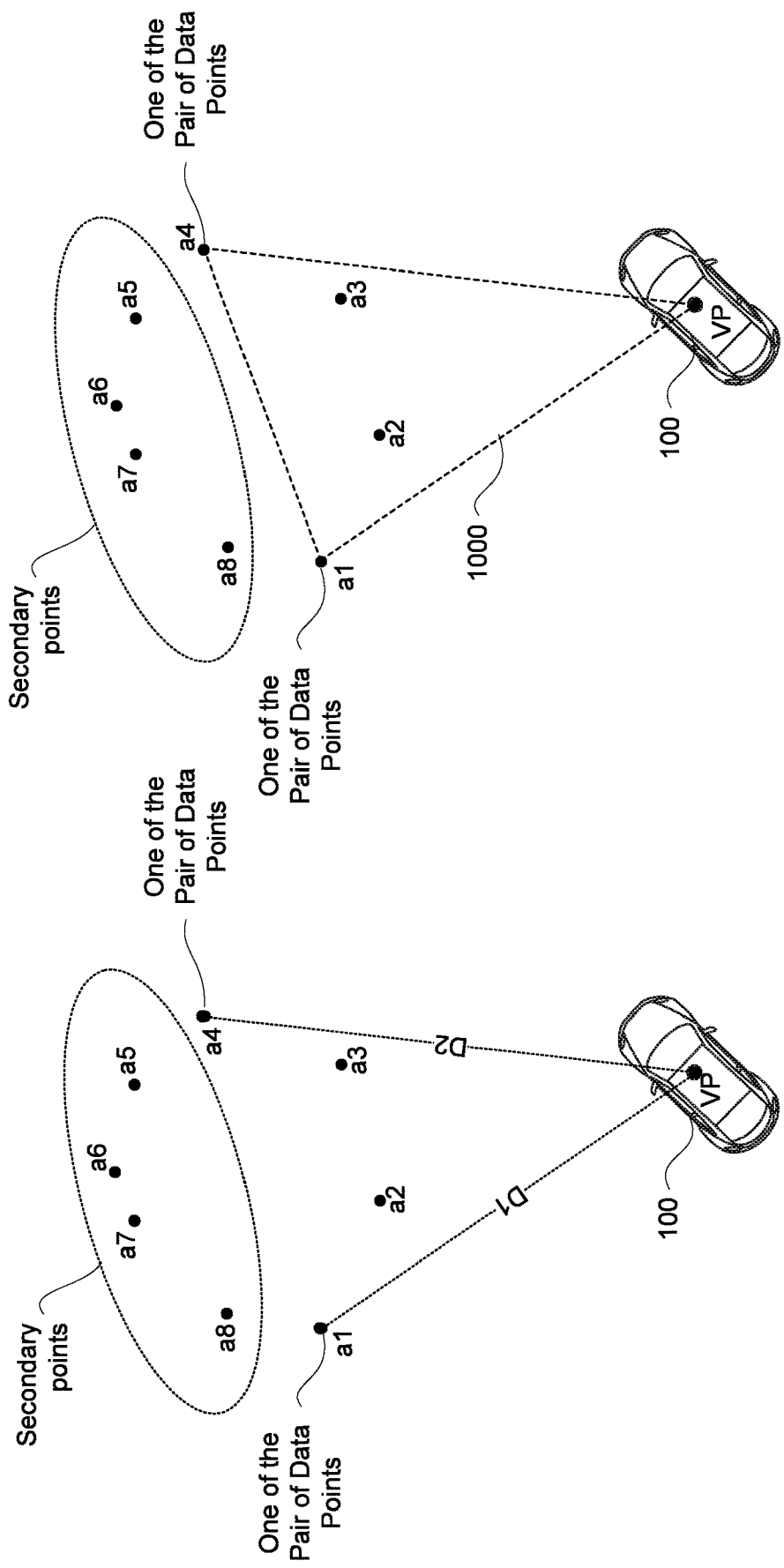
FIG. 9 is an example representation of a vehicle and data points in accordance with aspect of the disclosure.
FIG. 10 is an example representation of a vehicle, data points, and a space in accordance with aspect of the disclosure.

A set of one or more secondary points may then be identified. For instance, the secondary points may be those of the first model or the modified convex hull that are located farther from the point on the vehicle than the pair of points. For example, turning to FIG. 9, the distance between the point on the vehicle and the pair of data points a1, a4 are represented by D1 and D2, respectively. In this regard, data points a5-a8 and a11 are each farther from VP than the distances D1 and D2 (or rather, than the pair of data points a1, a4). In this regard, each of data points a5-a8 may be identified as secondary points. Alternatively, the vehicle's computing devices may identify the set of one or more secondary data points by determining a space defined by a point on the vehicle, the first point, and the second point. Because the space is defined by 3 points, the space may have a triangular shape. Points of the first model that are outside of the space may be identified as secondary points. Turning to FIG. 10, a space 1000 is defined by the point VP and data points a1 and a4. Because the data points a5-a8 are outside of the space 900, the data points may be identified as secondary points.

Figure 11:
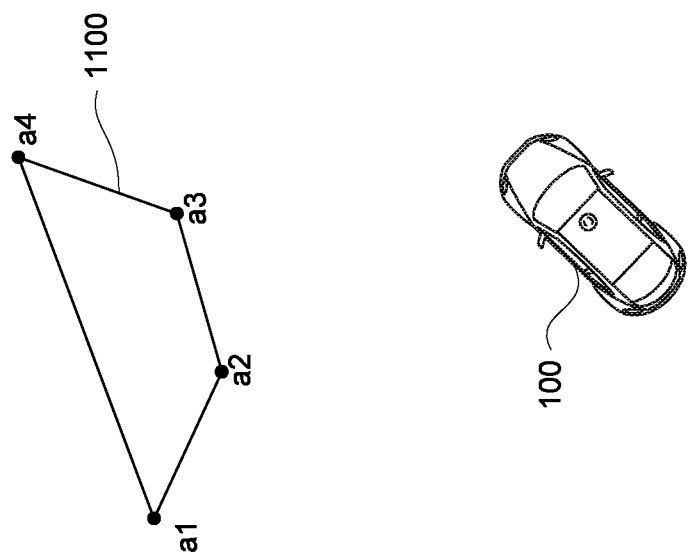
FIG. 11 is an example representation of a vehicle and a second model in accordance with aspect of the disclosure.

The computing devices may then determine a second model by filtering or otherwise removing the secondary points from the data points of the first model. For instance, as shown in FIG. 11, data points a5-a8 (being identified as secondary points) may be removed from the first model. The vehicle's computing devices may then determine a second model based on the remaining data points a1-a4 and a9-a10, here second model 1100.

The second model may be a significant reduction in the complexity of a model of an object corresponding to a polyhedron. In addition, even between two 2D models representing the same object, a comparison of the first model 600 of FIG. 6 to the second model 1100 of FIG. 11 demonstrates the reduction in complexity by removing secondary points from a 2D model (i.e. the first model). Thus, the second model is a simplified version of the first model for the same object. For instance, the first model has 8 vertices while the second model has only 4 vertices. As such, where computation time and complexity are controlled by the number of points in a model representing an object, reducing the number of points in a model representing an object may increase the speed and efficiency of the computations necessary for controlling the vehicle safely.

As noted above, the vehicle's computing devices may control the vehicle based on the second model. For instance, the second model may be passed to various other systems of the vehicle, such as behavior modeling systems (such as behavior modeling system 176) and path or trajectory planning systems (such as the planning system 168). Again, the data of the second model may be flagged or otherwise identified as corresponding to an object that the vehicle is not able to drive over or through. By reducing the number of vertices and overall amount of data in the models representing objects that are being processed by these systems, the vehicle's computing devices may again save significant time and computing resources. This can be useful for allowing the vehicle's computing devices to make driving decisions quickly and effectively. For one instance, the vehicle's various systems and computing devices may determine a distance between the vehicle and the contour model, and control the vehicle by maintaining a safe distance from the detected object. For another instance, the vehicle's various systems and computing devices may determine whether there is an overlap between the vehicle and the contour model, and control the vehicle based on whether there is an overlap. For still another instance, the vehicle's various systems and computing devices may predict a behavior of the detected object by predicting a shift and/or rotation of the contour model, and control the vehicle based on the predicted behavior.

Figure 12:
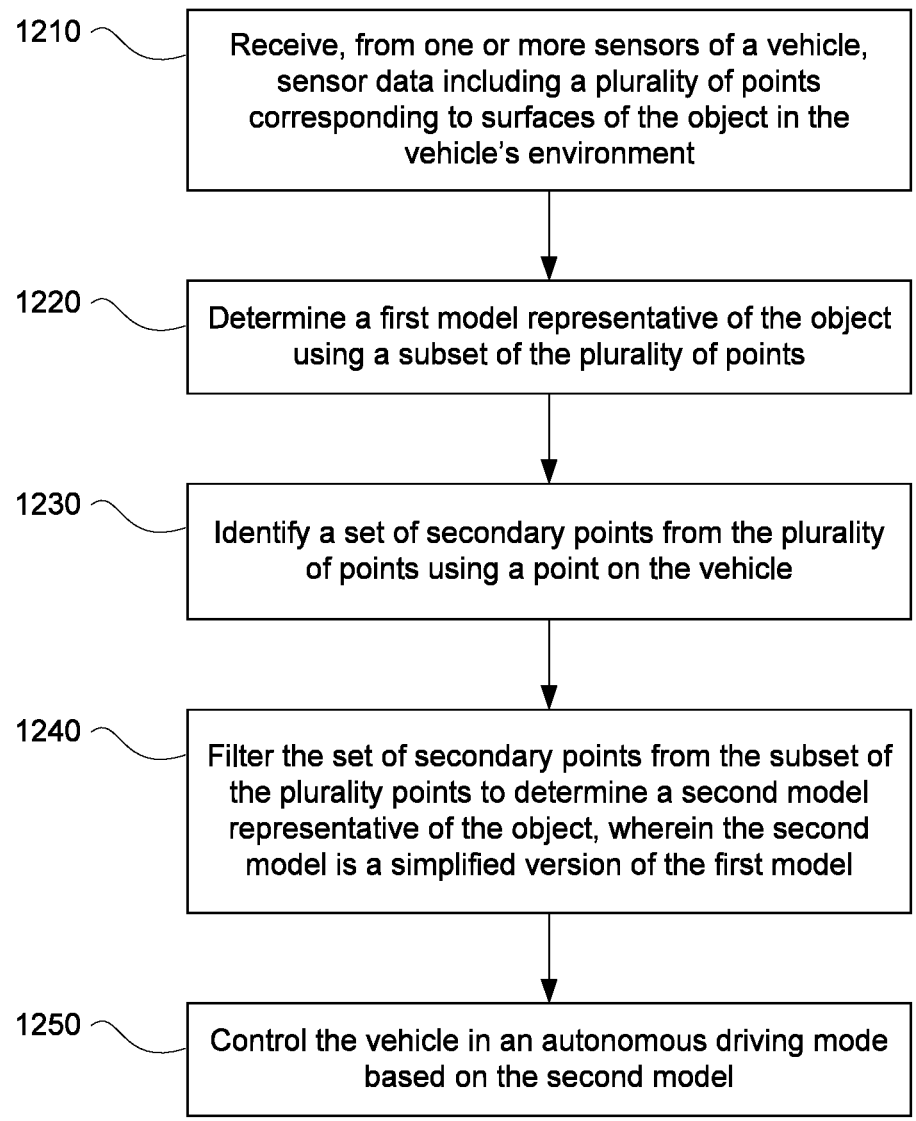
FIG. 12 is an example flow diagram in accordance with aspects of the disclosure.

FIG. 12 includes an example flow diagram 1200 of some of the examples for assessing impact of blockages on an autonomous vehicle transportation service, which may be performed by one or more processors such as the processors of computing devices 110 or another computing device of vehicle 100. For instance, at block 1210, sensor data including a plurality of points corresponding to surfaces of the object in the vehicle's environment is received from one or more sensors of the vehicle. At block 1220, a first model representative of the object is determined using a subset of the plurality of points. At block 1230, a set of secondary points is identified from the plurality of points using a point on the vehicle. At block 1240, the set of secondary points is filtered from the subset of the plurality points to determine a second model representative of the object, wherein the second model is a simplified version of the first model. At block 1250, the vehicle is controlled in an autonomous driving mode based on the second model.

The features described herein may provide for the generation of simplified models which represent objects that are both informative and efficient for computation purposes without sacrificing safety. By reducing complexities of the models of objects, computations using those models may be simplified, which may reduce the computational resources required and shorten the amount of time needed for the computations. This, in turn, may improve the response time and safety of the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle using a simplified model of an object, the method comprising:
receiving, by one or more computing devices from one or more sensors of the vehicle, sensor data including a plurality of data points corresponding to surfaces of the object in the vehicle's environment;
determining, by the one or more computing devices, a first model representative of the object using a subset of the plurality of data points;
identifying, by the one or more computing devices, a set of secondary data points from the subset of the plurality of data points using a point on the vehicle;
filtering, by the one or more computing devices, the set of secondary data points from the subset of the plurality data points to determine a second model representative of the object, wherein the second model is a simplified version of the first model; and controlling, by the one or more computing devices, the vehicle in an autonomous driving mode based on the second model.

2. The method of claim 1, wherein the plurality of data points are received from a LIDAR sensor of the vehicle, and the point on the vehicle is a point on the LIDAR sensor.

3. The method of claim 1, wherein determining the first model includes determining a convex hull of the plurality of data points defined by the subset of the plurality of data points.

4. The method of claim 3, wherein identifying the set of secondary data points includes identifying data points of the convex hull corresponding to a side of the convex hull that are oriented away from the vehicle relative to other data points of the convex hull.

5. The method of claim 3, wherein identifying the set of secondary data points includes determining a modified convex hull based on the subset of the plurality of data points and the point on the vehicle.

6. The method of claim 5, wherein identifying the set of secondary data points further includes identifying a pair of data points from the modified convex hull using the point on the vehicle.

7. The method of claim 6, wherein the pair of data points correspond to two data points in the modified convex hull on either side of the point on the vehicle.

8. The method of claim 6, wherein the pair of data points correspond to two data points in the modified convex hull that are closest to the point on the vehicle.

9. The method of claim 6, wherein identifying the set of secondary data points includes identifying data points of the modified convex hull or the first model that are located farther from the point on the vehicle than either of the pair of data points.

10. The method of claim 1, wherein the set of secondary data points includes identifying a pair of data points from the subset of the plurality of data points using a reference vector originating at the point on the vehicle.

11. The method of claim 10, wherein the reference vector extends in a direction of one of a heading of the vehicle or an orientation of the vehicle.

12. The method of claim 10 wherein the reference vector extends in a direction of a direction of traffic of a lane in which the vehicle is traveling.

13. The method of claim 10, wherein a first of the pair of data points is identified as a data point of the subset of the plurality of data points that is positioned at a smallest angle relative to the reference angle of the vehicle, and a second of the pair of data points is identified as a data point of the subset of the plurality of data points that is positioned at a greatest angle relative to the reference angle of the vehicle.

14. The method of claim 13, wherein identifying the set of secondary data points further includes determining a space defined by the first of the pair of data points, the second of the pair of data points, and the point on the vehicle.

15. The method of claim 14, wherein identifying the set of secondary data points includes identifying ones of the subset of the plurality of data points that are outside of the space.

16. The method of claim 1, wherein the first model is determined by ignoring a height dimension of the plurality of data points.

17. The method of claim 1, wherein the first model is determined by projecting the plurality of data points onto a two-dimensional plane.

18. The method of claim 1, wherein each of the first model and the second model are two-dimensional representations of the object.

19. The method of claim 1, wherein the point on the vehicle is a two-dimensional point.

20. The method of claim 1, wherein controlling the vehicle based on the second model includes passing data of the second model to one or more systems of the vehicle in order to make driving decisions for the vehicle using the second model.

* * * * *

UNITED STATES PATENT AND TRADEMARK OFFICE
CERTIFICATE OF CORRECTION

PATENT NO.         : 11,048,254 B2                                                     Page 1 of 1
APPLICATION NO.    : 16/380398
DATED              : June 29, 2021
INVENTOR(S)        : Dong Li and Fang Da It is certified that error appears in the above-identified patent and that said Letters Patent is hereby corrected as shown below:

In the Claims

Claim 13, Column 14, Line 10:
Now reads: "the reference angle"; should read -- the reference vector --

Claim 13, Column 14, Line 13:
Now reads: "the reference angle"; should read -- the reference vector --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*